(12) United States Patent
Kronenberger

(10) Patent No.: US 7,027,891 B2
(45) Date of Patent: Apr. 11, 2006

(54) ARTICLE DISPENSING SYSTEM AND METHOD OF DISPENSING ARTICLES

(76) Inventor: Robert Kronenberger, 1180 Hamilton, Deerfield, IL (US) 60015

( * ) Notice: Subject to any disclaimer, the term of this patent is extended or adjusted under 35 U.S.C. 154(b) by 0 days.

(21) Appl. No.: 10/721,130

(22) Filed: Nov. 25, 2003

(65) Prior Publication Data

US 2005/0113966 A1 May 26, 2005

(51) Int. Cl.
*G06F 17/00* (2006.01)
(52) U.S. Cl. .................................... 700/237; 700/232
(58) Field of Classification Search ................ 700/231, 700/232, 236, 237, 241, 244; 235/381, 385
See application file for complete search history.

(56) References Cited

U.S. PATENT DOCUMENTS

| | | | | |
|---|---|---|---|---|
| 5,287,269 A | * | 2/1994 | Dorrough et al. | 705/17 |
| 5,440,108 A | * | 8/1995 | Tran et al. | 235/381 |
| 5,450,938 A | * | 9/1995 | Rademacher | 194/206 |
| 6,056,194 A | * | 5/2000 | Kolls | 235/381 |
| 6,304,796 B1 | * | 10/2001 | Ding | 700/237 |
| 6,330,491 B1 | * | 12/2001 | Lion | 700/237 |
| 6,430,470 B1 | * | 8/2002 | Nakajima et al. | 700/237 |
| 6,695,166 B1 | * | 2/2004 | Long | 221/14 |
| 6,711,465 B1 | * | 3/2004 | Tomassi | 700/236 |
| 6,754,559 B1 | * | 6/2004 | Itako | 700/237 |
| 6,772,048 B1 | * | 8/2004 | Leibu et al. | 700/241 |

\* cited by examiner

*Primary Examiner*—Khoi H. Tran
(74) *Attorney, Agent, or Firm*—Wood, Phillips, Katz, Clark & Mortimer

(57) ABSTRACT

A system for dispensing articles to a consumer. The system has a first station at which articles having an assigned cash value are dispensed. The first station a) has a first terminal at which a user identification related to an account can be input to process a user request for an article and b) is capable of causing articles to be dispensed to a user. The dispensing system further has a processing system that causes an article to be dispensed to a user at the first station in response to a user's inputting of a user's identification related to an account at the first terminal.

17 Claims, 6 Drawing Sheets

ARTICLE DISPENSING SYSTEM AND METHOD OF DISPENSING ARTICLES

BACKGROUND OF THE INVENTION

1. Field of the Invention

This invention relates to article dispensing systems, such as vending machines and, more particularly, to an article dispensing system that is operable without the requirement of utilizing a foreign object, such as currency or a currency equivalent. The invention is also directed to a method of using an article dispensing system.

2. Background Art

In many different environments, articles are displayed, or otherwise identified, for consumer initiated dispensing. Certain of these systems are commonly identified as "vending machines". By not requiring active supervision, these systems potentially account for a significant financial return for their operators. The nature of the articles to be dispensed varies widely. As just examples of articles dispensed in this manner are transportation tickets, edible/consumable items, functional items, novelty items, etc.

In a typical dispensing system, the different available articles are identifiable by the consumer either by being viewable through a transparent wall or by reason of there being a depiction or description of the particular article(s) which can be recognized by the consumer. The cost of each article may also be identified. To dispense the desired article(s), the consumer is required to insert either currency or tokens/cards representing currency. Once this is done, the selected article is situated to be removed by the consumer.

While the above types of systems have existed for decades, and have gone through various evolutionary stages, a number of drawbacks are inherent in their generic design. First of all, those systems that require the input of currency often have limitations as to what currency will be accepted. Some require exact change. Some are limited as to the denomination of bill that will be accepted. Often those in the vicinity of a vending machine and desirous of making a purchase, but lacking the required currency, will be incapable of consummating a purchase. The result is that a sale is lost, as a result of which a potential consumer is unsatisfied, and revenue to the system operator is reduced.

Another problem with systems requiring the input of currency is that the currency handling mechanism is often prone to malfunctioning. Bill reading mechanisms are often incapable of reading worn/faded currency. Commonly, systems with the ability to make change malfunction so that either no change, or an inaccurate amount of change, is returned to the consumer. This leads to another level of maintenance and accounting on the part of the system operator who is required to field requests for refunds and process all such transactions. Such a system also inherently encourages fraudulent claims for refunds which may affect the net revenue recoverable for operation of such systems.

Systems that accept and store currency are also prone to being tampered with by thieves. To minimize losses, system owners routinely, regularly remove the currency from systems at each site where they are installed. Aside from the inconvenience and potential expense that may be associated with regular currency removal from these systems, a would-be thief may not be deterred, even if he/she is aware of the fact that currency is regularly removed from the systems, and may inflict damage that accounts for down time and potentially costly repairs to equipment.

Systems that accept tokens or cards in lieu of currency also have drawbacks. Another level of labor is required to produce a token/paper equivalent to the currency and to carry out and monitor the conversion process for the consumers. This requires either that personnel be assigned to perform the conversion function or that another mechanical system be made available for this purpose.

In this industry, a very large volume of sales is lost to potentially willing consumers by reason of the unavailability of currency or tokens/cards to operate dispensing equipment. One environment where the problem is clearly evident is in sporting arenas in which participants are engaged in athletic activities. The participants, often significant in number, are commonly in gear suitable for the specific activity in which they are engaged and do not carry with them foreign articles, such as a wallet, change holder, or any type of token/card that may be utilized in a dispensing system. A dehydrated athlete will commonly walk by vending machines containing refreshments, realizing that he/she has no ability to purchase the same without retrieving currency or a token/card equivalent.

All of the above system limitations lead to a high level of frustration on the part of a potential consumer and a significant loss of revenue to those owning the systems. The vending industry continues to seek out ways to make articles conveniently available to the consuming public in a manner which reliably assures that they will receive the appropriate compensation for each such article dispensed.

SUMMARY OF THE INVENTION

In one form, the invention is directed to a system for dispensing articles to a consumer. The system has a first station at which articles having an assigned cash value are dispensed. The first station a) has a first terminal at which a user identification related to an account can be input to process a user request for an article and b) is capable of causing articles to be dispensed to a user. The dispensing system further has a processing system that causes an article to be dispensed to a user at the first station in response to a user's inputting of a user's identification related to an account at the first terminal.

In one form, a plurality of articles having different cash values are provided at the first station to be dispensed.

The system may be capable of monitoring a user cash account maintainable by a user and related to a user's identification.

In one form, the first station has an input site at which a user can initiate a transaction to cause dispensing of an article at the first station.

At the first station, a user can initiate a transaction by identifying through the input site an article of a desired cash value to be dispensed.

In one form, the processing system is capable of determining whether a balance in a user's cash account is at least equal to an assigned cash value to an article that is selected through a user request for the selected article at the first station.

The processing system may be capable of adding funds to a user cash account in response to a user direction at the first station.

In one form, the terminal has a key pad into which the user identification related to an account can be input.

The dispensing system may further include a credit card reader to allow funds to be added to the user's cash account by processing the credit card.

In one form, the articles are tickets or tokens redeemable for at least one of a) another article and b) a service.

Alternatively, the articles may be at least one of a) an edible, consumable item, b) a functional item, and c) a novelty item.

The system may further include a second station that is similar to the first station. The processing system causes an article to be dispensed to a user at either of the first and second stations in response to a user's inputting of a user's identification related to an account at the terminal at either of the first and second stations.

The processing system may further include a central processor at a first location through which control of each of the first and second stations is coordinated at second and third locations, respectively, that are remote from the first location.

The central processor may be capable of tracking transactions carried out at the first and second stations from the first location.

In one form, the first terminal is capable of processing a user request for an article without requiring inputting of any foreign object at the first terminal.

The invention is further directed to a method of dispensing articles. In one form, the method includes the steps of: providing a first station at which articles can be dispensed to a user; creating a cash account for a first user; assigning a user identification related to the first user's cash account; at the first station processing a request by the first user for a selected article by determining the first user's identification in response to an input by the first user; after determining the first user's identification, causing the selected article to be dispensed; and causing an assigned value for the article to be reflected in the first user's cash account.

The step of processing a request by the first user may involve processing a request by determining the first user's identification in response to an input by the first user that does not require input or processing of a foreign object at the first station.

The method may further include the steps of providing a second station at which articles can be dispensed to a user and operatively interconnecting the first and second stations so that the first user can cause a selected article to be dispensed at either of the first and second stations and the assigned value for the selected article to be dispensed at either the first and second stations to be reflected on the first user's cash account.

The method may further include the step of monitoring transactions at the first station from a location remote from the first station.

In one form, the step of providing a first station involves providing a first station at which articles are dispensed that are at least one of a) tickets or tokens redeemable for at least one of i) another article and ii) a service, b) an edible/consumable item, c) a functional item, and d) a novelty item.

DETAILED DESCRIPTION OF THE DRAWINGS

Figure 1:
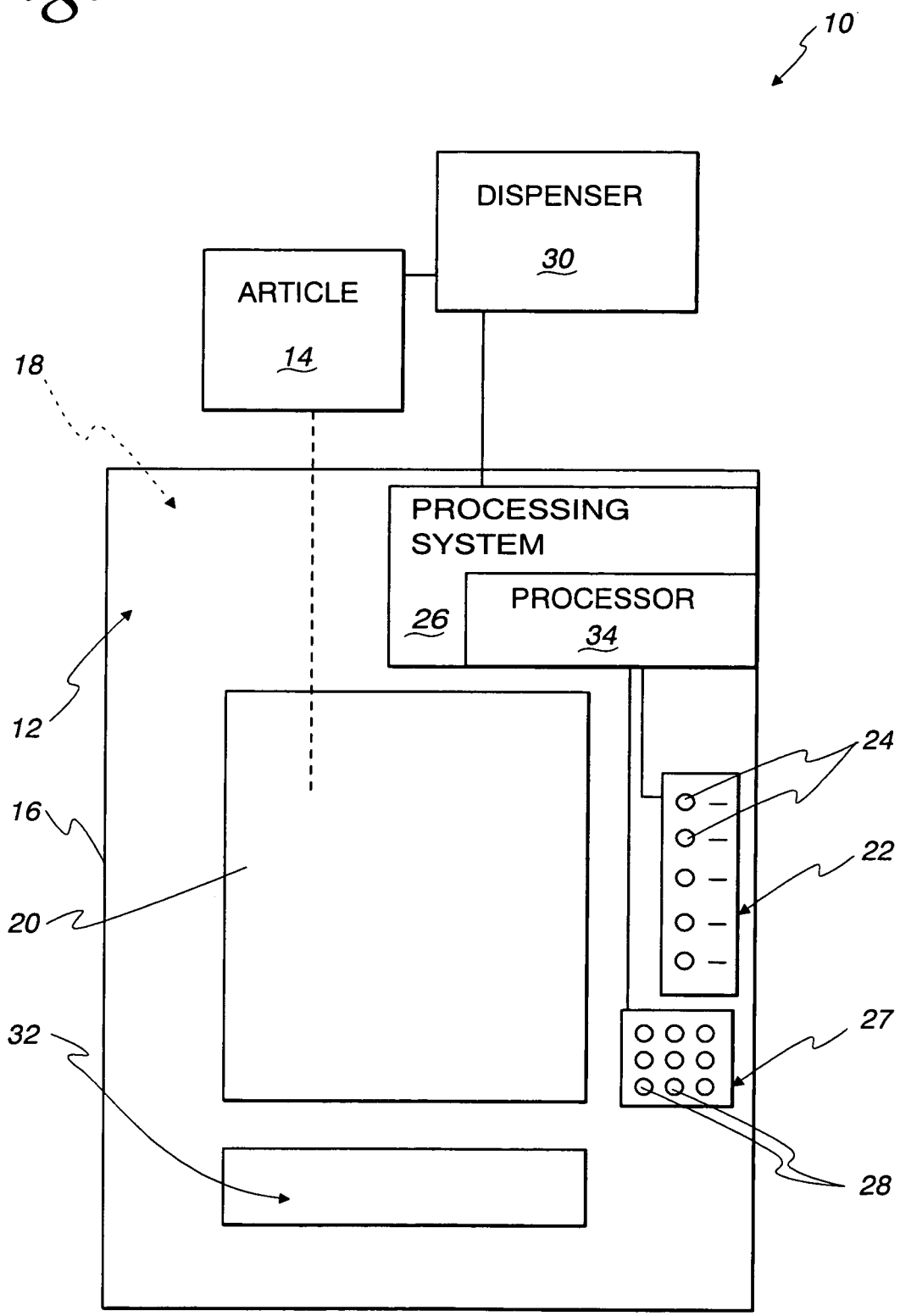
FIG. 1 is a partially schematic, front elevation view of one form of system for dispensing articles, according to the present invention, and including a single station.

In FIG. 1, one form of system for dispensing articles to a consumer, according to the present invention, is shown at 10. The system 10 consists of a first station 12 at which articles 14 are stored and can be dispensed to a consumer/user. The particular configuration of the station 12 is not critical to the present invention. The station 12 shown is in the form of a conventional type "vending machine". With this configuration, a housing 16 bounds a storage space 18 for the articles 14. The stored articles 14 are displayed for viewing through a transparent panel 20 so as to facilitate identification of each available article 14 and its assigned value.

The station 12 incorporates a conventional control panel at 22 through which a user request for an article is initiated. A plurality of keys/pads 24 on the panel 22 can be activated either singly or in a specific combination to identify the article 14 to be selected.

In a conventional vending machine, to initiate a transaction, the user would be required to input currency, in the form of bills and/or coins to reach or exceed the assigned cash value for the article 14 desired. This step is obviated by the present invention. As explained in greater detail below, the user opens a cash account that is accessed and monitored, either at the site of the station 12 or remotely therefrom. The coordination between the funds and a "purchase" is carried out through a processing system 26, which is shown in FIG. 1 as integrated into the station 12. Instead of inputting any foreign object at the station 12, the user inputs his/her identification at a terminal 27, which user identification is related to the aforementioned account. In this embodiment, the terminal 27 has associated keys/pads 28 which can be activated in a predetermined manner to identify the user. The keys/pads 28 may be identified with numbers, letters or other indicia which have been assigned using a personal identification system selected by the operator of the system 10. Once the user identification is input, the processing system 26 verifies the authenticity of the user and determines whether the balance in the cash account is at least equal to the cash value assigned to the selected article 14. The processing system 26 then activates a dispenser 30 which causes the selected article 14 to be released from a stored state, as to a pick opening 32 at which it can be accessed by the user.

Accordingly, the user is allowed the freedom to operate the system 10 without inputting any foreign object, as by inputting a code through the terminal 27. Thus, a user can draw on an existing account to dispense articles 14 without requiring any cash or tokens on his/her person to effect activation of the system 10. The station 12 is shown to have a processor 34 in the processing system 26 which allows the operator to track transactions that occur at the station 12.

From an owner/operator standpoint, cash handling at the station 12 can be eliminated, or at least reduced, so as to mitigate damages in the event that an unauthorized access is gained to a cash storage receptacle on the station by a thief. By notifying those in the vicinity of the station 12 that no cash is present, the likelihood of tampering by a would-be thief is reduced, thereby eliminating the loss of cash and losses associated with repair of equipment with damage inflicted by a would-be thief.

It should be understood that the nature of the articles 14 that are dispensed is not in any way limited. The articles 14 can take virtually a limitless number of different forms and are non-monetary in form. As just examples, the articles 14 might be tickets or tokens redeemable for another article or a service. Alternatively, the articles could be any of a) an edible/consumable item, b) a functional item, and c) a novelty item. The functional items may be any useable item, ranging from paper items such as tissue, to complex mechanical components or articles. The novelty items may be, for example, toys or items performing merely an aesthetic function.

Figure 2:
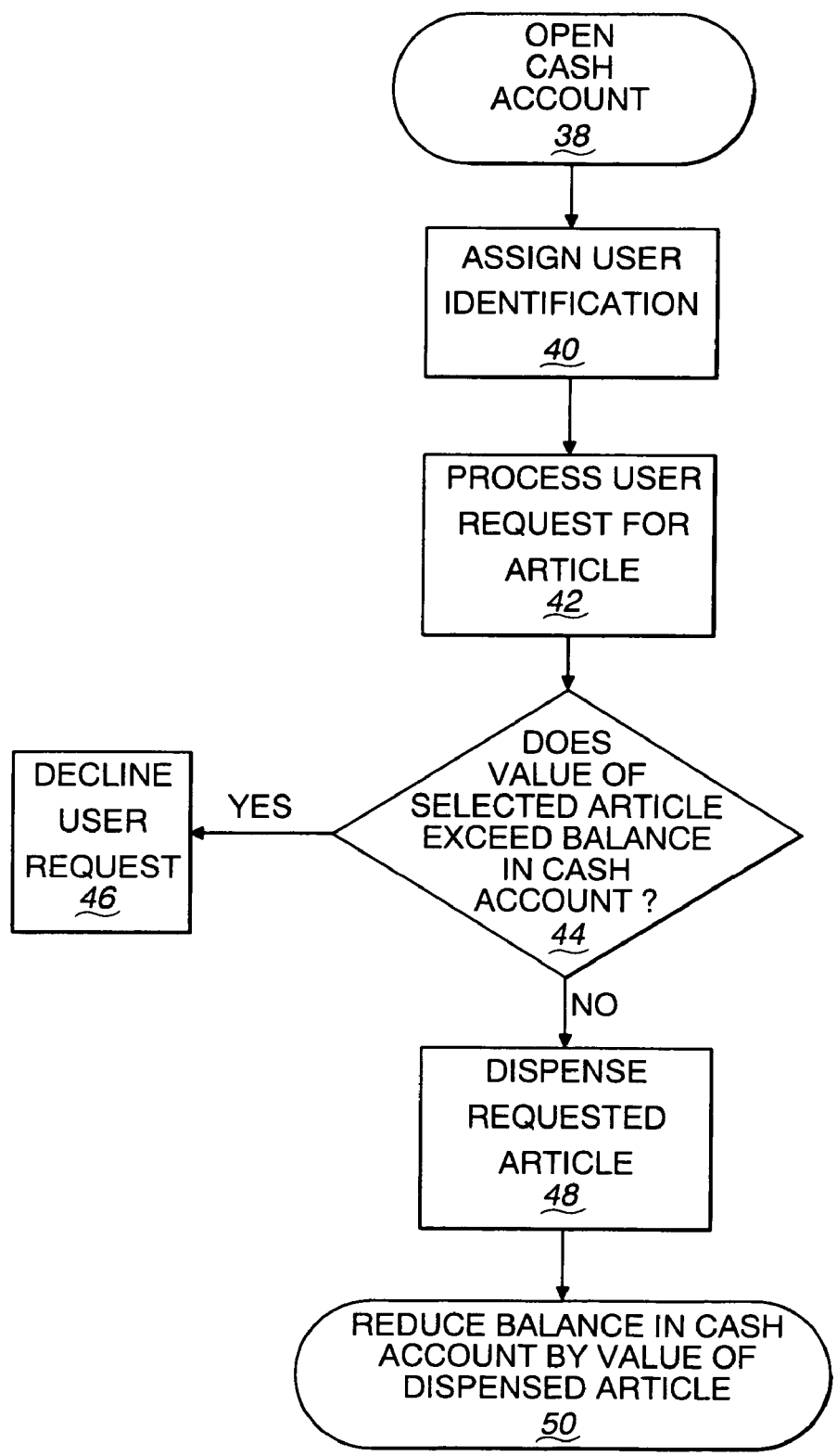
FIG. 2 is a flow diagram showing the steps of operation of the system in FIG. 1 by an owner/operator.

A flow diagram, describing the system from the owner's/operator's standpoint, is shown in FIG. 2. In block 38, a cash account is opened for a particular user. In block 40, a user identification is assigned correlated to the cash account. The system 10 processes a user request for an article at the station 12 as shown at block 42. Through the processing system 26, the user request is processed. In block 44, a query is made as to whether the value of the requested article exceeds the balance in the cash account. If the answer to the query is "yes", the user request is declined, as indicated at block 46. If the answer to the query is "no" the dispenser 30 is operated to cause the requested article to be dispensed, as shown at block 48. The processing system 26 reduces the balance in the cash account by the value of the requested article, as indicated at block 50. An additional processing fee may be deducted from the account.

Figure 3:
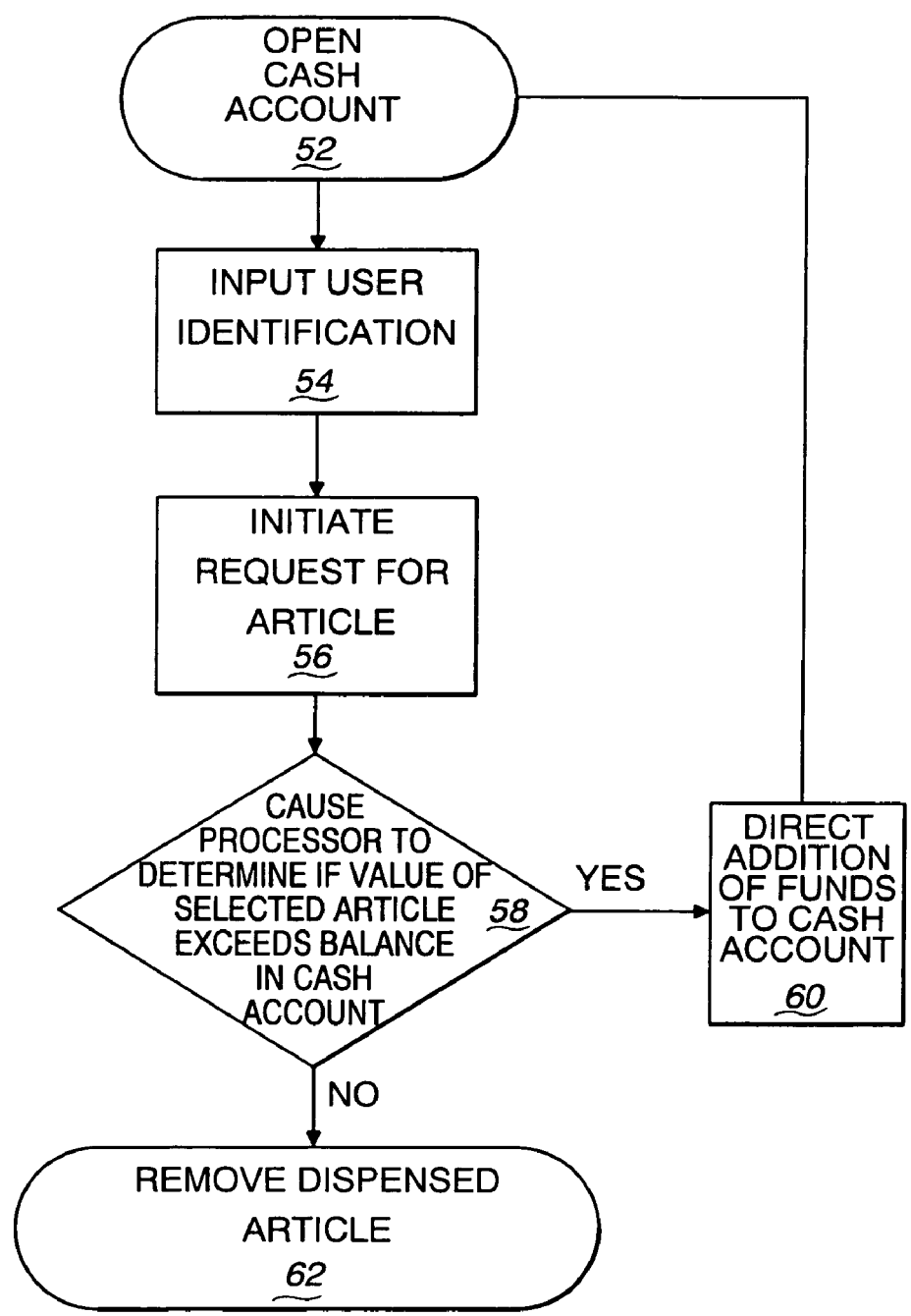
FIG. 3 is a flow diagram showing the steps of operation of the system in FIG. 1 from the standpoint of a user/consumer.

The same process, from the user's standpoint, is depicted in flow diagram form in FIG. 3. As shown in block 52, the user opens a cash account. Once the account is opened, the user can input her/his identification at the terminal 27, as indicted at block 54. Before or after inputting the identification, the user initiates a request for a selected article, as indicated at block 56. As indicated at block 58, this input causes the processor to determine if the value of the requested article exceeds the balance in the cash account. If the response to the query is "yes", and the user wishes to consummate the dispensing of the article, the user must direct additional funds to the cash account, as indicated at block 60. Alternatively, the transaction is terminated. If the answer to the query is "no", the article is dispensed and removed by the user as indicated at block 62.

Figure 4:
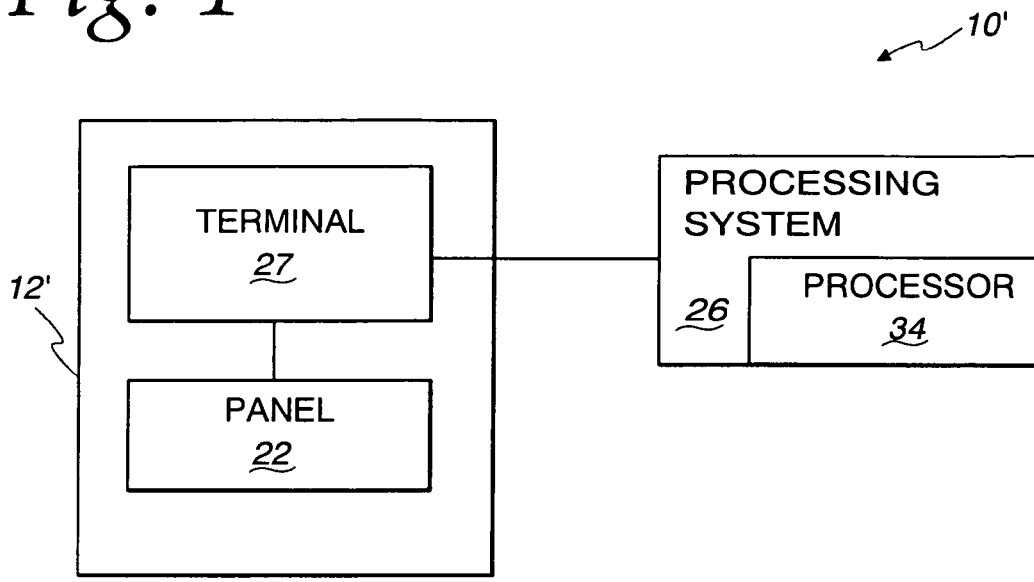
FIG. 4 is a schematic representation of a modified form of system as in FIG. 1, with a single station.

Variations of the basic system will now be described. As shown in FIG. 4 at 10', another form of the inventive system for dispensing articles has a station 12', corresponding to the station 12. The primary difference in this system 10' is that the processing system 26, and processor 34 that is a part thereof, are located remotely from the station 12' upon which the panel 22 and terminal 27 are provided. A wired or wireless connection can be established for communication between the station 12' and the processing system 26. This permits a less complicated and less expensive construction for the individual satellite stations 12, 12', which may be networked, as described below.

Figure 5:
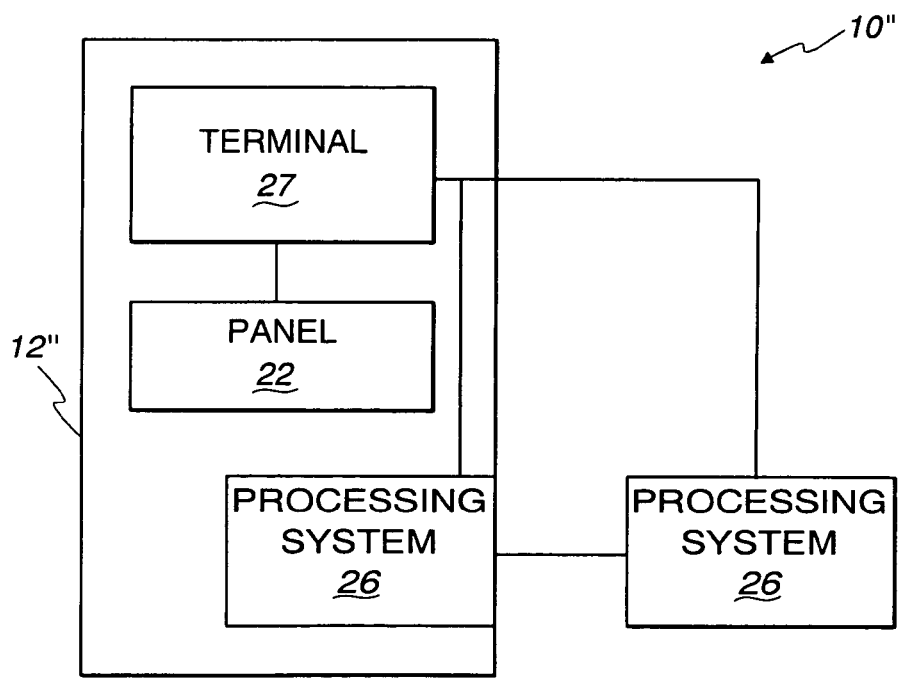
FIG. 5 is a view as in FIG. 4 of a still further modified form of system as in FIG. 1, with a single station.

In FIG. 5, a further modified form of system is shown at 10" and includes an inputting panel 22 and terminal 27 that are part of a station 12'". The system 10" differs from the system 10' by reason of the processing system's 26 including operating components both at the station 12" and remotely therefrom.

Figure 6:
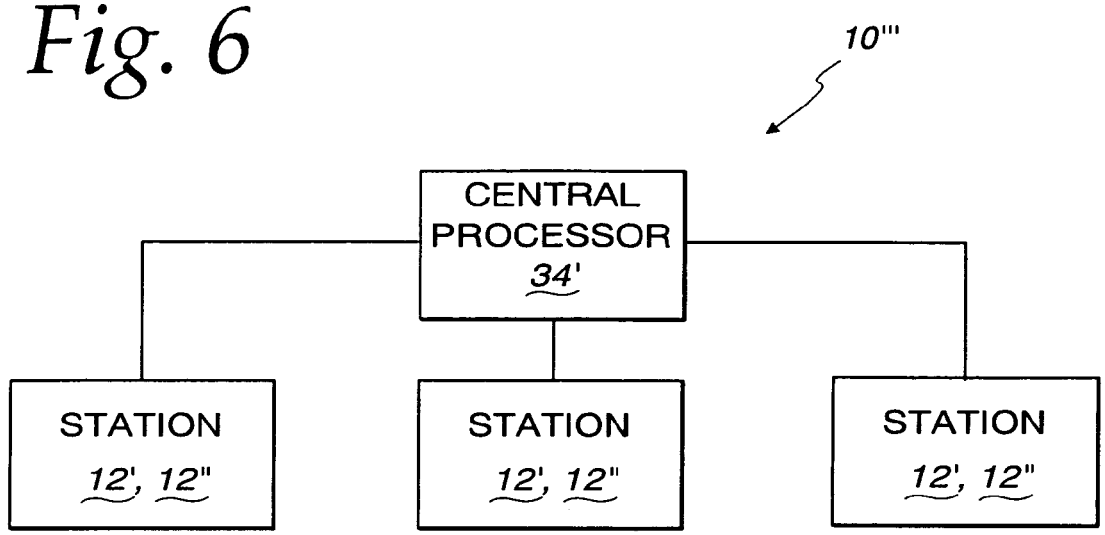
FIG. 6 is a schematic representation of a network of stations of the type shown in FIG. 1 and showing a central processor through which operation is coordinated.

In FIG. 6, a modified form of system is shown at 10'" to include, in this case, three satellite stations 12', 12", having the aforementioned configuration, which are interconnected through a wired or wireless network to be centrally controlled and monitored by a central processor 34'. Through this arrangement, articles 14 can be dispensed at multiple locations with all transactions capable of being monitored from a single location. In the event of a currency free operation, a substantial cost savings can be anticipated. Central processing increases overall management efficiency.

Figure 7:
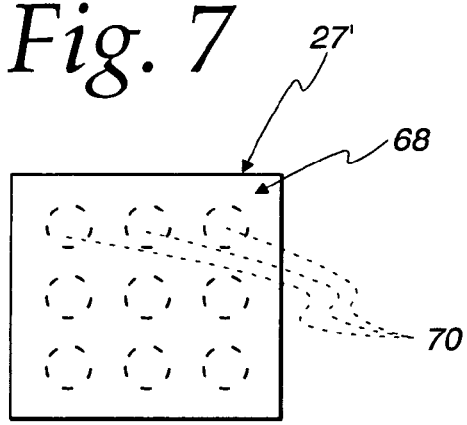
FIG. 7 is an enlarged, front elevation view of one form of user input on the station in FIG. 1 using touch screen technology.
Figure 8:
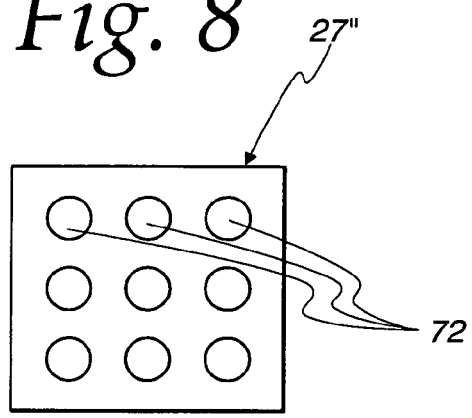
FIG. 8 is a view as in FIG. 7 wherein mechanical keys/pads are utilized as an alternative to the touch screen.
Figure 9:
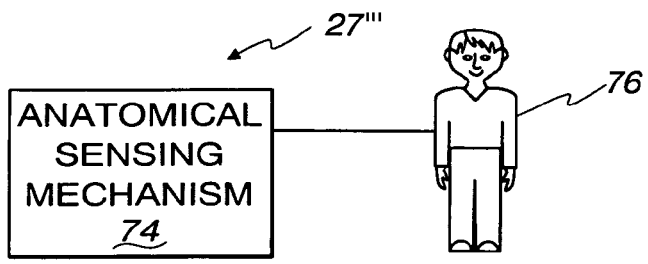
FIG. 9 is a schematic representation of a modified form of user input that senses the identification of a user by recognizing anatomical characteristics of a user.

In FIGS. 7–9, variations of the terminal 27 are shown at 26', 26" and 26'", respectively. On the terminal 27, a touch screen 68 is shown with various touch locations at 70 which allow a user to input his/her appropriate identification.

In FIG. 8, the terminal 27" is shown to have manually operable keys/pads 72 for inputting user identification data.

In FIG. 9, the terminal 27'" has a sensing mechanism 74 that is responsive to the detection of anatomical attributes peculiar to a user 76. For example, the sensing mechanism 74 may have a scanner to perform corneal recognition or a voice recognition capability to verify a user identification. Other identification mechanisms are contemplated.

Figure 10:
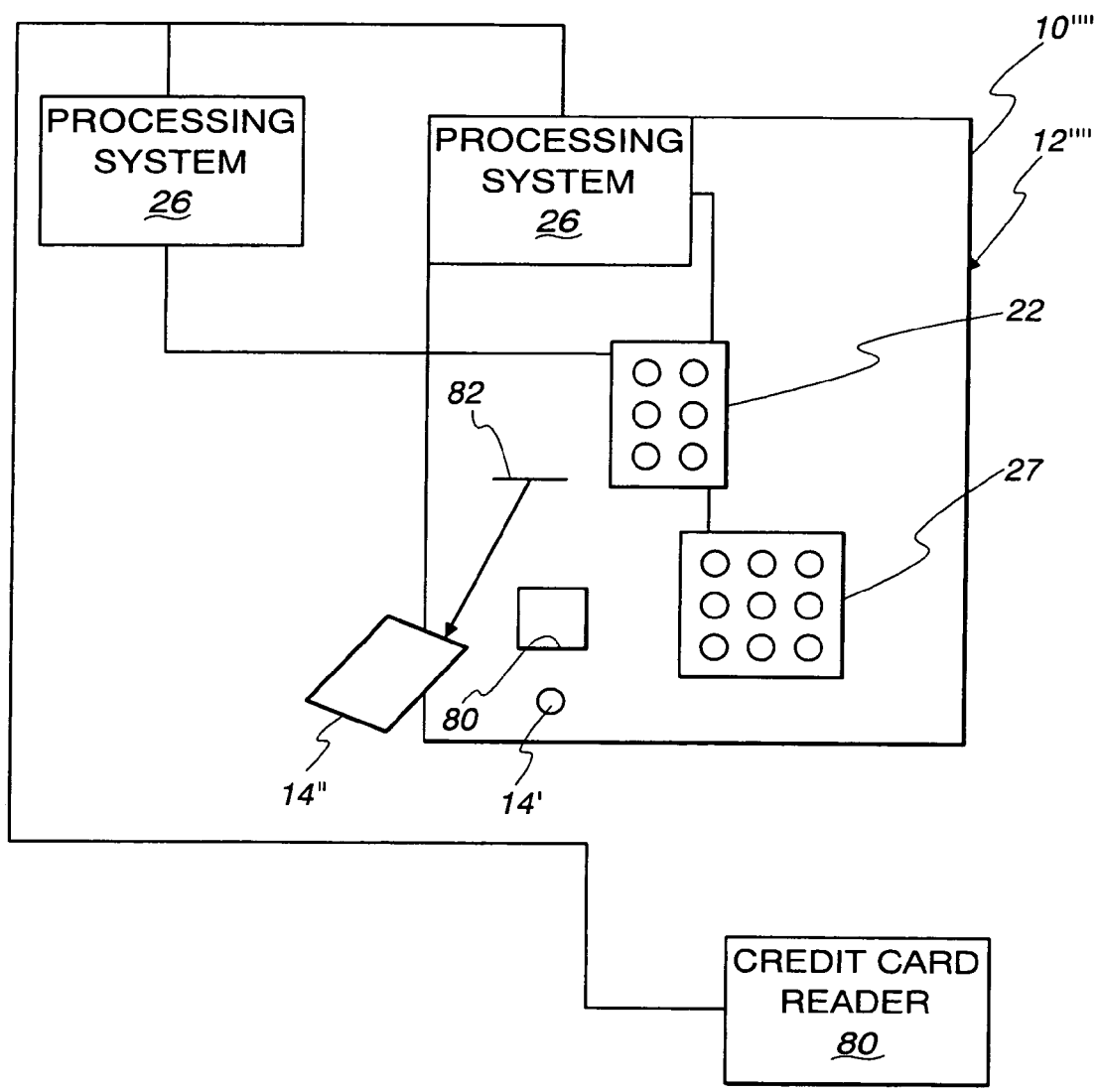
FIG. 10 is a partially schematic representation of a modified form of system for dispensing articles, according to the present invention, and including a credit card reader through which a user can replenish monies in an account which are useable to purchase articles, which in this case are shown as tokens/cards.

In FIG. 10, a modified form of system is shown at 10"". The system 10"" has a station 12"" with a panel 22 and a terminal 27, as previously described, which cooperate with the processing system 26 that is integrated into the station 12"" and/or remotely located.

The system 10"" incorporates a credit card reader 80 which can be integrated into the processing system 26 to add additional funds to the user's account either at the station 10"" or at a remote location. The credit card reader 80 might likewise have a cash accepting capability for the same purpose. In the system 10"", the articles 14', 14" dispensed are respectively shown as a token which is dispensed at a opening 80 and a ticket that is dispensed from a slot 82.

The foregoing disclosure of specific embodiments is intended to be illustrative of the broad concepts comprehended by the invention.

What is claimed is:

1. A system for dispensing articles to a consumer, said system comprising:

a first station at which articles having an assigned cash value are dispensed, said first station a) comprising a first terminal at which a user identification related to an established vending account is inputted by a user directly to a control panel upon the first terminal without inputting any foreign object to process a user request for an article and b) capable of causing articles to be dispensed to a user, said dispensing system further comprising a processing system, said processing system causing an article to be dispensed to a user at the first station in response to a user's inputting of a user's identification related to the established vending account at the first terminal, said system further comprising a second station that is similar to the first station and the processing system causes an article to be dispensed to a user at either of the first and second stations in response to a user's inputting of a user's identification related to the established vending account directly at the terminal at either of the first and second stations, wherein the processing system further comprises a central processor at a first location through which control of each of the first and second stations is coordinated at second and third locations, respectively, that are remote from the first location, wherein the central processor is capable of tracking transactions carried out at the first and second stations from the first location.

2. The system for dispensing articles according to claim 1 wherein a plurality of articles having different cash values are provided at the first station to be dispensed.

3. The system for dispensing articles according to claim 1 wherein the processing system is capable of monitoring a user cash account maintainable by a user and related to a user's identification.

4. The system for dispensing articles according to claim 1 wherein the first station further comprises an input site at which a user can initiate a transaction to cause dispensing of an article at the first station.

5. The system for dispensing articles according to claim 4 wherein articles of different cash values can be dispensed at the first station and a user can initiate a transaction by identifying through the input site an article of a desired cash value to be dispensed.

6. The system for dispensing articles according to claim 3 wherein the processing system is capable of determining whether a balance in a user cash account is at least equal to an assigned cash value to an article that is selected through a user request for the selected article at the first station.

7. The system for dispensing articles according to claim 3 wherein the processing system is capable of adding funds to a user cash account in response to a user direction at the first station.

8. The system for dispensing articles according to claim 7 wherein the first terminal comprises a key pad into which a user identification related to an account can be input.

9. The system for dispensing articles according to claim 7 wherein the dispensing system further comprises a credit card reader to allow funds to be added to a user cash account by processing a credit card.

10. The system for dispensing articles according to claim 1 wherein the articles comprise tickets or tokens redeemable for at least one of a) another article and b) a service.

11. The system for dispensing articles according to claim 1 wherein the articles comprise at least one of a) an edible/consumable item, b) a functional item, and c) a novelty item.

12. The system for dispensing articles according to claim 1 wherein the first terminal is capable of processing a user request for an article without requiring inputting of any foreign object at the first terminal.

13. A method of dispensing articles, said method comprising the steps of:
providing a first station at which articles can be dispensed to a user;
creating a cash vending account for a first user;
assigning a user identification related to the first user's cash vending account;
at the first station processing a request by the first user for a selected article by determining the first user's identification in response to an input by the first user directly to a control panel at the first station without inputting any foreign object;
after determining the first user's identification, causing the selected article to be dispensed;
causing an assigned value for the article to be reflected in the first user's cash vending account,
providing a second station at which articles can be dispensed to a user; and
operatively interconnecting the first and second stations so that the first user can cause a selected article to be dispensed at either of the first and second stations and cause the assigned value for the selected article dispensed at either of the first and second stations to be reflected on the first user's cash vending account.

14. A method of dispensing articles according to claim 13 wherein the step of processing a request by the first user comprises processing a request by the first user by determining the first user's identification, in response to an input by the first user, that does not require input or processing of a foreign object at the first station.

15. A method of dispensing articles according to claim 13 further comprising the step of monitoring transactions at the first station from a location remote from the first station.

16. A method of dispensing articles according to claim 13 wherein the step of providing a first station comprises providing a first station at which articles comprising at least one of: a) tickets or tokens redeemable for at least one of i) another article and ii) a service; b) an edible/consumable item; c) a functional item; and d) a novelty item can be dispensed to a user.

17. A system for dispensing articles to a consumer, said system comprising:
a first station at which articles having an assigned cash value are dispensed and through which a user cash vending account can be accessed,
said first station a) comprising a first terminal at which a user identification related to an established vending account can be directly input to process a user request for an article and b) capable of causing articles to be dispensed to a user without requiring any of any foreign object input by a user at the first station,
said dispensing system further comprising a processing system, said processing system causing c) an article to be dispensed to a user at the first station in response to a user's inputting of a user's identification related to an account at the first terminal and d) the cash valve of the article to be applied against the user cash vending account,
wherein the first station comprises a sensor mechanism that allows a user identification to be made through the detection of anatomical attributes peculiar to a user; said system further comprising a second station that is similar to the first station and the processing system causes an article to be dispensed to a user at either of the first and second stations in response to a user's inputting of a user's identification related to the vending account directly at the terminal at either of the first and second stations.

* * * * *